United States Patent [19]
Delamare et al.

[11] Patent Number: 5,686,772
[45] Date of Patent: Nov. 11, 1997

[54] MAGNETIC BEARING AND AN ASSEMBLY COMPRISING A STATOR PORTION AND A ROTOR PORTION SUSPENDED VIA SUCH A BEARING

[75] Inventors: Jérôme Delamare; Jean-Paul Yonnet; Elisabeth Rulliere, all of Grenoble, France

[73] Assignee: Alcatel Cit, Paris, France

[21] Appl. No.: 374,180

[22] Filed: Jan. 18, 1995

[30] Foreign Application Priority Data

Jan. 19, 1994 [FR] France .................................. 94 00537

[51] Int. Cl.⁶ .................................................. H02K 7/09
[52] U.S. Cl. ........................ 310/90.5; 310/90; 84/123; 417/420; 417/423; 417/352
[58] Field of Search .................... 310/90, 90.5; 384/123; 417/420, 423, 352

[56] References Cited

U.S. PATENT DOCUMENTS

| | | | |
|---|---|---|---|
| 4,620,752 | 11/1986 | Fremerey et al. | 310/90.5 |
| 4,717,315 | 1/1988 | Miki et al. | 417/424 |
| 4,787,829 | 11/1988 | Miyazaki et al. | 417/353 |
| 5,117,448 | 5/1992 | Penato et al. | 378/132 |
| 5,152,679 | 10/1992 | Kanemitsu et al. | 417/423.4 |
| 5,166,566 | 11/1992 | Bernhardt et al. | 310/90.5 |
| 5,350,283 | 9/1994 | Nakazeki et al. | 417/420 |

FOREIGN PATENT DOCUMENTS

| | | |
|---|---|---|
| 0445691A1 | 9/1991 | European Pat. Off. . |
| 2512507 | 3/1983 | France . |
| 3713534A1 | 11/1987 | Germany . |

OTHER PUBLICATIONS

*Patent Abstracts of Japan*, vol. 9, No. 235 (M–415)(1958) 21 Sep. 1985 & JP-A-60 091 011 (Rigaku Keisoku) 22 May 1985.
French Search Report FR 9400537.

*Primary Examiner*—Steven L. Stephan
*Assistant Examiner*—Elvin G. Enad
*Attorney, Agent, or Firm*—Sughrue,Mion,Zinn,Macpeak & Seas, PLLC

[57] ABSTRACT

The bearing has a fixed portion, and a moving portion, and includes a passive magnetic abutment composed of a fixed element secured to said fixed portion, and of a moving element secured to said moving portion. The bearing further including a passive magnetic centering bearing which is coaxial with said passive abutment, and which is composed of a fixed element secured to the fixed portion, and of a moving element secured to the moving portion, the passive abutment externally surrounding the passive centering bearing, the passive abutment having axial stiffness $k_{ab}$, radial stiffness $k_{rb}$, a mean radius $R_{mb}$, and an inside radius $R_{ib}$, and said passive centering bearing having axial stiffness $k_{ac}$, radial stiffness $k_{rc}$, a mean radius $R_{mc}$, and an outside radius $R_{ec}$, an air gap e separating the fixed element of said abutment from the moving element thereof and separating the fixed element of the centering bearing from the moving element thereof, these parameters being chosen so as to satisfy the following three relationships simultaneously:

1) $|k_{rc}| > |k_{rb}|$
2) $R_{mb} > R_{mc}$ $$\sqrt{\frac{|k_{ac}|}{|k_{ab}|}}$$

3) $R_{ib} - R_{ec} \geq 3e$.

8 Claims, 3 Drawing Sheets

MAGNETIC BEARING AND AN ASSEMBLY COMPRISING A STATOR PORTION AND A ROTOR PORTION SUSPENDED VIA SUCH A BEARING

The present invention relates to a magnetic bearing enabling a solid body to be rotated about a fixed axis.

The invention applies to partial or total magnetic support of rotary bodies, such as flywheels, disks, turbomolecular pump rotors, etc.

Preferably, though not exclusively, the invention applies to rotors of large diameters relative to axial length, i.e. to a rotor for which the ratio of axial moment of inertia to transverse moment of inertia is somewhat greater than 1.

BACKGROUND OF THE INVENTION

It is known that to support a rotor, five degrees of freedom need to be controlled or defined.

If the center of gravity of the rotor is referenced O, with axis Oz coinciding with the axis of rotation, and axes Ox and Oy being two perpendicular axes situated in the plane perpendicular to Oz at O, then the five degrees of freedom relative to the center of gravity O of the rotor, may be defined as follows:

axial translation along Oz;

radial translation: both along Ox; and along Oy; and two perpendicular rotations: $\theta_x$ about axis Ox and $\theta_y$ about axis Oy.

In magnetic supports, these degrees of freedom are controlled by a plurality of magnetic bearings. Both active magnetic bearings and passive magnetic bearings exist. Active magnetic bearings comprise electromagnets which create return forces and which are associated with position detectors, a servo-control circuit controlling the current passing through the electromagnets. Passive magnetic bearings are constituted by permanent magnets only, and are of two types: a) a first type in which both the moving portion and the fixed portion are constituted by permanent magnets, each portion being constituted by at least one magnet; and b) a "variable-reluctance" second type in which only one of the portions, fixed or moving, carries a permanent magnet, the other portion merely carrying a magnetic circuit. The second type necessarily operates by attraction, whereas the first type may operate by attraction or by repulsion.

Naturally, passive magnetic bearings are much simpler and less costly.

However, by choosing the transfer function correctly, active bearings make it possible to damp the motion that they control, and in any event, according to Earnshaw's theorem, it is necessary for at least one of the three translations, along Ox, Oy or Oz of the rotor, to be controlled actively.

Three currently-known solutions are given below:

1) All five degrees of freedom are controlled actively. This solution is complex and costly. It requires five servo-control channels. In a concrete example, there are two active radial bearings which are situated at respective ends of the rotor, and which control translation along the axes Ox and Oy, and the rotation $\theta_x$ and $\theta_y$, and an active axial abutment which controls translation along the axis Oz.

2) One degree of freedom is controlled actively: translation along axis Oz by means of an active axial abutment and the other four degrees of freedom are controlled passively by means of two spaced-apart passive radial bearings. In this case, there is a single servo-control channel, but the need to have two passive radial bearings that are spaced apart axially from each other increases overall size.

3) Two degrees of freedom are controlled actively: translation along the axes Ox and Oy by means of an active bearing requiring two servo-control channels, and the other three degrees of freedom: translation along the axis Oz and rotations $\theta_x$ and $\theta_y$, are controlled via a passive axial abutment. Compared with the preceding configuration, this configuration is advantageous because it requires only two bearings, and it is compact because there is only one radial bearing. However, it is necessary to have two servo-control channels with this configuration. This configuration is described in Patent Document FR-A-2 565 310.

There are two known types of passive bearing:

1) Radial bearings or centering bearings which provide radial stability along the axes Ox and Oy, but which are unstable along the axis Oz and with respect to rotations $\theta_x$ and $\theta_y$.

2) Axial abutments which provide stabilization along the axis Oz and with respect to the rotations $\theta_x$ and $\theta_y$, but which are unstable in translation along Ox and Oy.

Hereinafter, such a known conventional passive radial magnetic bearing, e.g. constituted by two magnetized rings, one of which is secured to a fixed portion, the other ring being secured to a moving portion, is referred to as a "passive magnetic centering bearing". In the same way, such a known conventional passive axial magnetic abutment, e.g. constituted by two magnetized rings, one of which is secured to a fixed portion, the other ring being secured to a moving portion, is referred to below as a "passive magnetic abutment".

OBJECTS AND SUMMARY OF THE INVENTION

An object of the present invention is to provide a passive radial magnetic bearing constituting a centering bearing that is angularly stable, i.e. that provides stability for four degrees of freedom: along the axes Ox and Oy, and with respect to the rotations $\theta_x$ and $\theta_y$, unlike known centering bearings.

Such a bearing makes it possible to implement cheap and highly simplified apparatus for fully supporting a solid body as it rotates about an accurately determined axis.

The invention provides a magnetic bearing enabling a solid body to rotate about a fixed axis z, the bearing having a circularly-symmetrical fixed portion, and a circularly-symmetrical moving portion, and including a passive magnetic abutment composed of a fixed element secured to said fixed portion, and of a moving element secured to said moving portion, said magnetic bearing further including a passive magnetic centering bearing which is coaxial with said passive abutment, and which is composed of a fixed element secured to said fixed portion, and of a moving element secured to said moving portion, said passive abutment externally surrounding said passive centering bearing, said passive abutment having axial stiffness $k_{ab}$, radial stiffness $k_{rb}$, a mean radius $R_{mb}$, and an inside radius $R_{ib}$, and said passive centering bearing having axial stiffness $k_{ac}$, radial stiffness $k_{rc}$, a mean radius $R_{mc}$, and an outside radius $R_{ec}$, an air gap e separating the fixed element of said abutment from the moving element thereof and separating the fixed element of said centering bearing from the moving element thereof, these parameters being chosen so as to satisfy the following three relationships simultaneously:

1) $|k_{rc}| > |k_{rb}|$

2) $R_{mb} > r_{mc}$ $$\sqrt{\frac{|k_{ac}|}{|k_{ab}|}}$$

3) $R_{ib} - R_{ec} \geq 3e$.

BRIEF DESCRIPTION OF THE DRAWINGS

Embodiments of the invention are described below with reference to the accompanying drawings, in which.

MORE DETAILED DESCRIPTION

Figure 1:
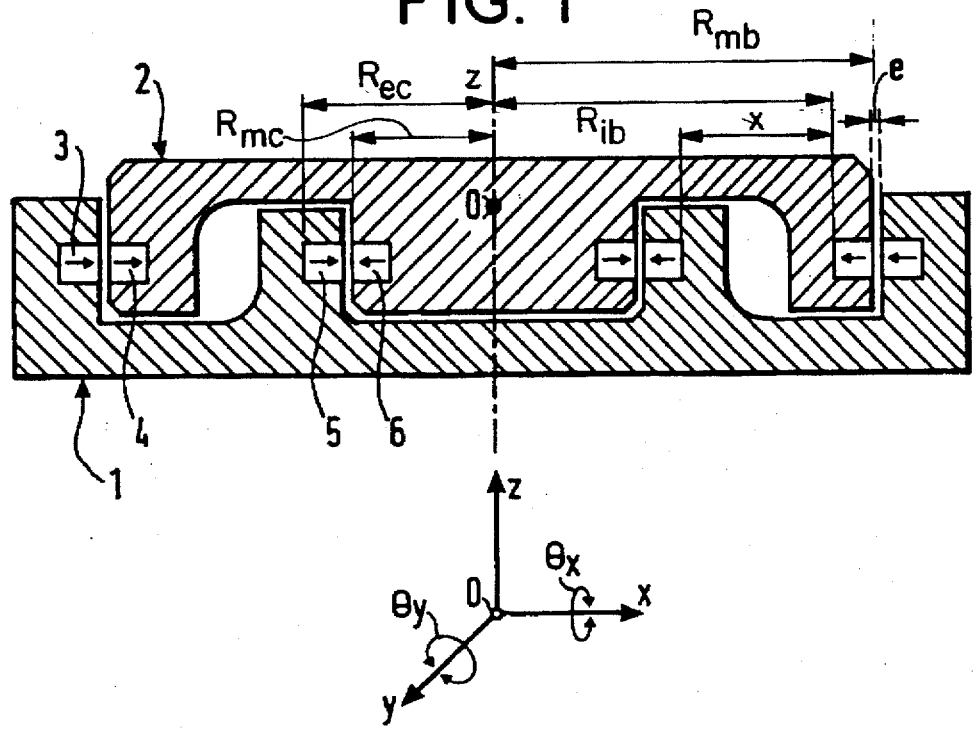
FIG. 1 shows a magnetic bearing of the invention, constituting a centering bearing that is angularly stable with respect to the rotations $\theta_x$ and $\theta_y$; three orthogonal axes Ox, Oy, and Oz originating from the center of inertia O of the moving body are shown adjacent to FIG. 1 so as to indicate the five degrees of freedom that are to be controlled: translation along Ox, Oy and Oz, respectively, and rotation $\theta_x$ and $\theta_y$ respectively about the axis Ox and about the axis Oy; the sixth degree of freedom: rotation about axis Oz being left free.

FIG. 1 shows a magnetic bearing having a fixed portion 1 that is circularly symmetrical about its axis z, and a moving portion 2 that is also circularly symmetrical. Its center of inertia is referenced O. The bearing includes a passive magnetic abutment composed of two magnetized rings 3 and 4, mounted to attract each other. Ring 3 is secured to the fixed portion 1, and ring 4 is secured to the moving portion 2. A passive magnetic centering bearing composed of two magnetized rings 5 and 6 mounted to repel each other is disposed coaxially with the passive abutment 3-4. Ring 5 is secured to the fixed portion 1, and ring 6 is secured to the moving portion 2. The passive centering bearing 5-6 is coaxial with and inside the passive abutment 3-4.

The polarization of the magnetized rings is indicated by arrows. In FIG. 1, the rings are magnetized radially. They could just as well be magnetized axially. However, in FIG. 1, the abutment 3-4 operates by attraction, and the centering bearing 5-6 operates by repulsion. In FIG. 1, the centering bearing 5-6 and the abutment 3-4 are in the same plane. They could be slightly mutually offset along axis z.

Figure 4:
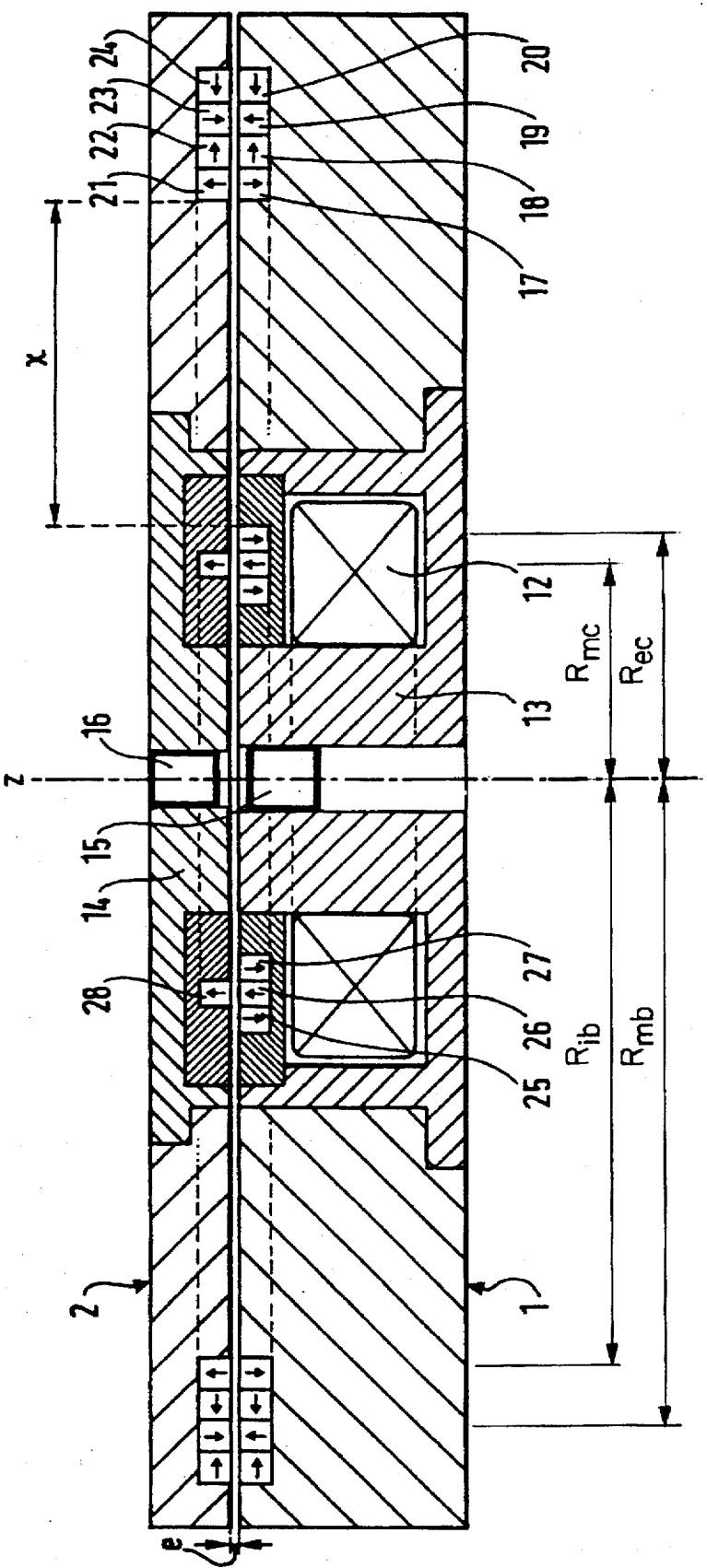
FIG. 4 is a variant of FIG. 3, in which variant the position along Oz is controlled actively via an active magnetic abutment.

Instead of having a single magnetized ring for each element of each unit (centering bearing or abutment), each element of each unit could be constituted by associating a plurality of magnetized rings, as shown in FIG. 4 which is described below.

The centering bearing 5-6 is defined by its mean radius $R_{mc}$, its outside radius $R_{ec}$, its radial stiffness $k_{rc}$, and its axial stiffness $k_{ac}$.

In the same way, the abutment 3-4 is defined by its mean radius $R_{mb}$, its inside radius $R_{ib}$, its radial stiffness $k_{rb}$, and its axial stiffness $k_{ab}$.

An air gap e separates the fixed element of the abutment from the moving element thereof and separates the fixed element of the centering bearing from the moving element thereof.

The various parameters are chosen so that the bearing constituted by associating the abutment unit 3-4 with the centering bearing unit 5-6 constitutes an angularly stable passive magnetic centering bearing, i.e. it centers the center of inertia O of the moving portion 2 on axis z, while providing stability with respect to rotation $\theta_x$ and $\theta_y$.

In this way, four degrees of freedom are controlled: translation along Ox and Oy and rotation $\theta_x$ and $\theta_y$.

The conditions that must be satisfied by the above parameters to achieve this result, are as follows:

1) $|k_{rc}| > |k_{rb}|$

2) $R_{mb} > R_{mc}$ $$\sqrt{\frac{|k_{ac}|}{|k_{ab}|}}$$

Figure 2:
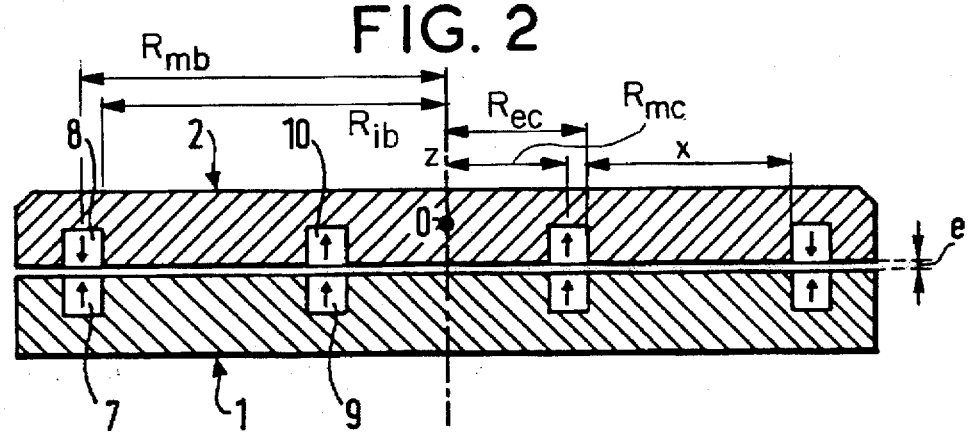
FIG. 2 is a variant of FIG. 1.

3) $R_{ib} - R_{ec} \geq 3e$ where the distance $R_{ib} - R_{ec}$ is marked "x" in FIGS. 1, 2, and 4.

FIG. 2 is a variant in which the abutment is an abutment which operates by repulsion and which comprises a magnetized ring 7 secured to the fixed portion 1 and a magnetized ring 8 secured to the moving portion 2. In this example, the rings are magnetized axially, but naturally they could be magnetized radially. In this variant, the centering bearing is a centering bearing which operates by attraction and which comprises a magnetized ring 9 secured to the fixed portion 1, and a magnetized ring 10 secured to the moving portion 2. As with the abutment, these axially magnetized rings could be magnetized radially.

As in the preceding example, the centering bearing 9-10 could be slightly offset axially relative to the abutment 7-8.

For the bearing to constitute a centering bearing that is angularly stable, the parameters mentioned above with reference to FIG. 1 must satisfy the same two conditions.

The bearings shown in FIGS. 1 and 2 both constitute angularly stable centering bearings. However, these bearings are unstable with respect to translation along axis z.

Figure 3:
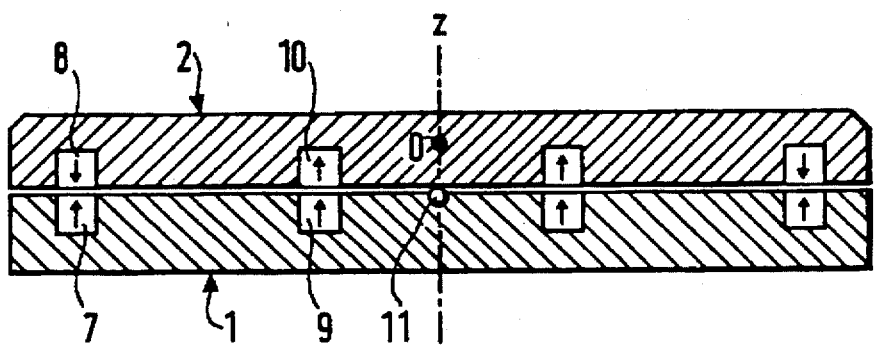
FIG. 3 shows a magnetic bearing of the invention constituting an angularly stable centering bearing, and in which position along axis Oz is defined mechanically, the bearing therefore constituting a system that provides full support on its own.

FIG. 3 shows a bearing that is similar to the bearing of FIG. 2, but in which the position of the moving portion 2 is defined axially by means of a mechanical abutment, which is a ball 11 in this example.

FIG. 4 shows another example of a bearing of the invention in which the position of the moving portion 2 with respect to translation along axis z is controlled by means of an active axial abutment comprising an electromagnet with its winding 12 and its magnetic circuit 13 on the fixed portion, and 14 on the moving portion. A position sensor 15-16 enables the winding 12 of the electromagnet to be powered electrically in conventional manner by means of a servo-control circuit that is known per se. In this bearing, the passive magnetic abutment operates by repulsion and comprises four magnetized rings 17, 18, 19, and 20 on the fixed portion 1 associated with four magnetized rings 21, 22, 23, and 24 on the moving portion 2. The passive magnetic centering bearing, which is situated coaxially with and inside the passive abutment, operates as an attractive centering bearing and includes three magnetized rings 25, 26, and 27 on the fixed portion and a single magnetized ring 28 on the moving portion 2.

In this way, and as shown, such a bearing is very simple and makes it possible for a solid moving body to be fully suspended as it rotates about axis z, with a single servo-control channel for actively positioning the moving portion 2 along axis z.

Figure 5:
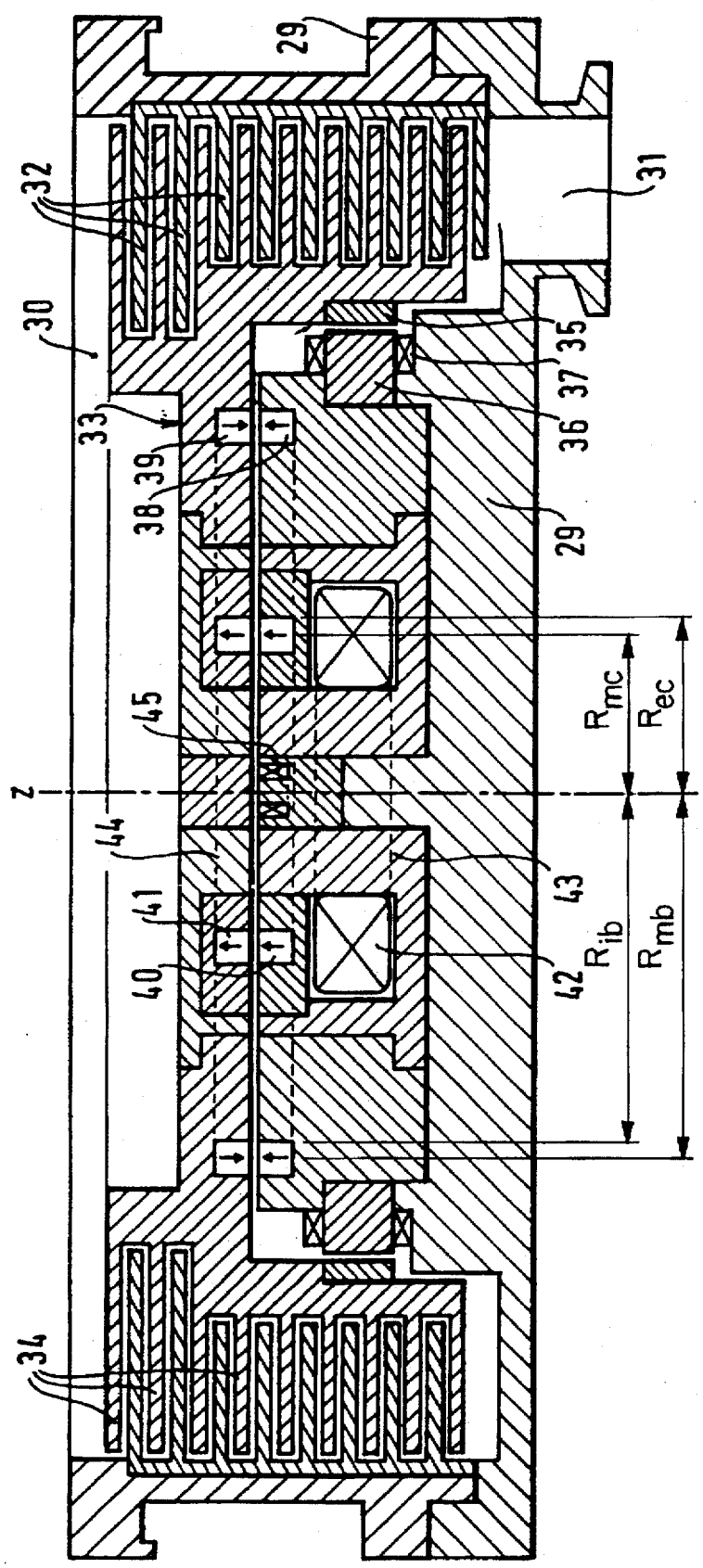
FIG. 5 shows a turbomolecular vane pump that is magnetically supported by a magnetic bearing as shown in FIG. 4.

FIG. 5 shows an example of a rotor assembly mounted to rotate in a stator and magnetically suspended by means of a bearing of the invention, in which example positioning along the axis of rotation z is performed actively via an active axial abutment.

This example is a turbomolecular pump comprising a rotor 33 provided with rotor vanes 34, and a stator 29 including a suction inlet 30, a delivery outlet 31, and stator vanes 32. The rotor is rotated by an electrical motor comprising a rotor portion 35 secured to the rotor 33 and a stator portion 36 provided with windings 37 and secured to the stator 29. Suspension is performed magnetically and in accordance with the bearing of the invention via a passive magnetic abutment comprising a magnetized ring 38 secured to the stator 29, and a magnetized ring 39 secured to the rotor 33, and via a passive magnetic centering bearing which is coaxial with and inside the abutment, and which comprises a magnetized ring 40 secured to the stator 29, and a magnetized ring 41 secured to the rotor 33. The abutment 38-39 operates by repulsion and the centering bearing 40-41 operates by attraction. Positioning along axis z is controlled via an active axial abutment comprising an electromagnet with its winding 42 and a magnetic circuit 43 on the stator, and 44 on the rotor. A position sensor 45 controls the current passing through the winding 42 via a servo-control circuit (not shown) such that the reference clearance between the rotor and the stator is taken into account.

We claim:

1. A magnetic bearing enabling a solid body having a center of gravity O to rotate about a fixed axis z, the bearing having a circularly-symmetrical fixed portion, and a circularly-symmetrical moving portion, and including a passive magnetic abutment composed of a fixed element secured to said fixed portion, and of a moving element secured to said moving portion, said magnetic bearing further including a passive magnetic centering bearing which is coaxial with said passive abutment, and which is composed of a fixed element secured to said fixed portion, and of a moving element secured to said moving portion, said passive abutment externally surrounding said passive centering bearing, said passive abutment having axial stiffness $k_{ab}$, radial stiffness $k_{rb}$, a mean radius $R_{mb}$, and ran inside radius $R_{ib}$, and said passive centering bearing having axial stiffness $k_{ac}$, radial stiffness $k_{rc}$, a mean radius $R_{mc}$, and an outside radius $R_{ec}$, an air gap e separating the fixed element of said abutment from the moving element thereof and separating the fixed element of said centering bearing from the moving element thereof, these parameters being chosen so as to satisfy the following three relationships simultaneously:

1) $|k_{rc}| > |k_{rb}|$

2) $R_{mb} > R_{mc}$ $$\sqrt{\frac{|k_{ac}|}{|k_{ab}|}}$$

3) $R_{ib} - R_{ec} \geq 3e$;

thereby providing stability about 4 degrees of freedom, namely; translation along axes Ox and Oy orthogonal to fixed axis Oz, and rotations $\theta_x$ and $\theta_y$, about axes Ox and Oy, respectively.

2. A magnetic bearing according to claim 1, wherein said passive abutment is of the type in which the fixed element of the abutment comprises at least one magnetized ring, and the moving element of the abutment also comprises at least one magnetized ring.

3. A magnetic bearing according to claim 1, wherein said passive centering bearing is of the type in which the fixed element of the centering bearing comprises at least one magnetized ring, and the moving element of the centering bearing also comprises at least one magnetized ring.

4. A magnetic bearing according to claim 1, further including means for axially positioning said moving portion along the fixed axis z.

5. A magnetic bearing according to claim 4, wherein said means are constituted by an active axial abutment.

6. A magnetic bearing according to claim 4, wherein said means are constituted by a mechanical abutment.

7. An assembly having a circularly symmetrical rotor portion and a fixed stator portion, and including rotary drive means for rotating the rotor portion relative to the stator portion, wherein the rotor portion is supported relative to the stator portion by a magnetic bearing according to claim 4, the rotor portion being secured to said moving portion of said bearing and the stator portion being secured to said fixed portion of said bearing.

8. An assembly according to claim 7, wherein the assembly is a turbomolecular pump.

* * * * *